March 31, 1936. W. F. GROENE ET AL Re. 19,905

CRANKSHAFT LATHE

Original Filed July 2, 1930 7 Sheets-Sheet 1

William F. Groene.
George W. Luning.
INVENTORS

BY allen + allen
ATTORNEYS

March 31, 1936. W. F. GROENE ET AL Re. 19,905

CRANKSHAFT LATHE

Original Filed July 2, 1930 7 Sheets-Sheet 2

William F. Groene.
George W. Luning.
INVENTORS

BY
Allen & Allen
ATTORNEYS

March 31, 1936. W. F. GROENE ET AL Re. 19,905

CRANKSHAFT LATHE

Original Filed July 2, 1930 7 Sheets-Sheet 3

William F. Groene,
George W Luning.
INVENTORS

BY Allen & Allen
ATTORNEYS

March 31, 1936. W. F. GROENE ET AL Re. 19,905
CRANKSHAFT LATHE
Original Filed July 2, 1930 7 Sheets-Sheet 4
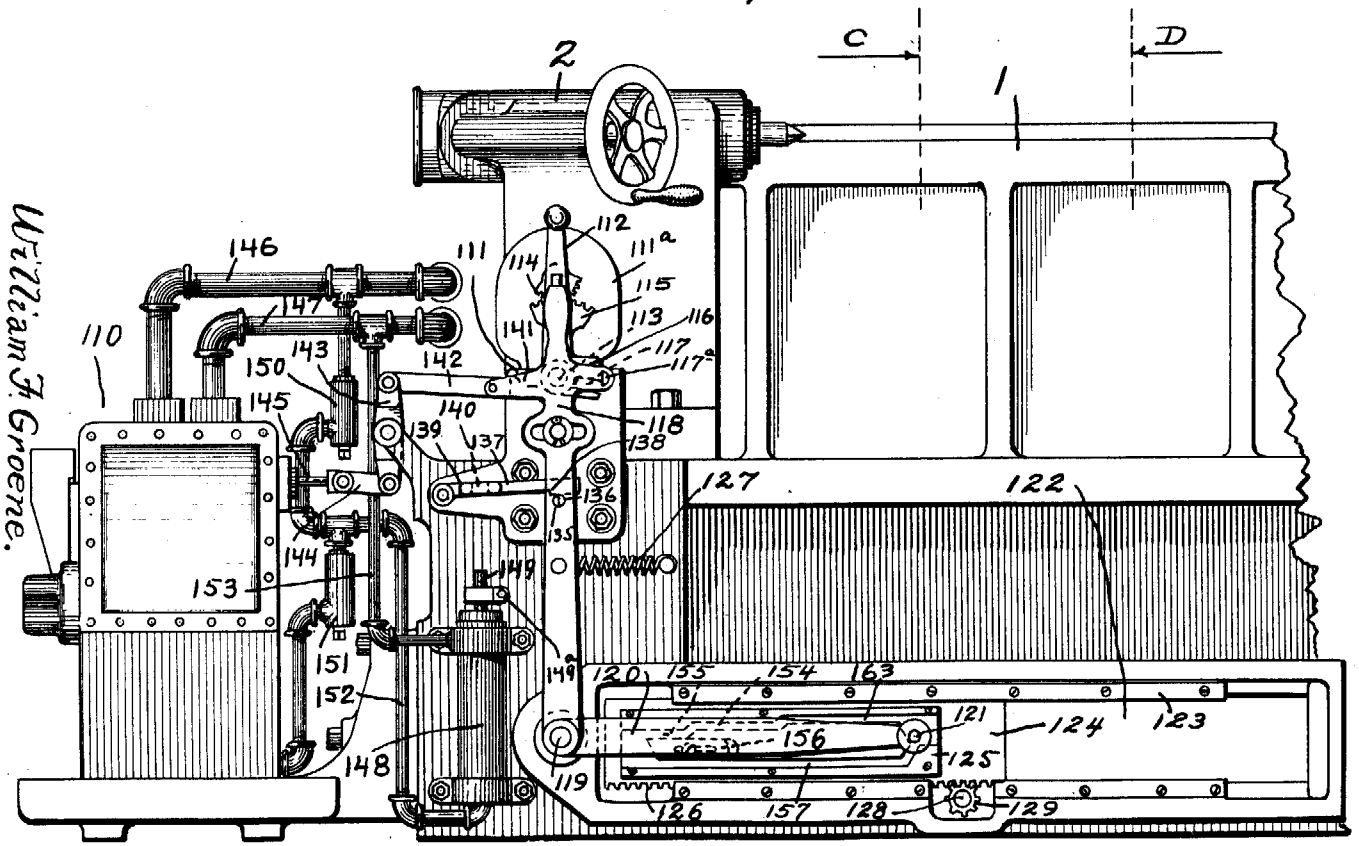
William F. Groene.
George W Luning. INVENTORS
BY
Allen & Allen
ATTORNEYS March 31, 1936. W. F. GROENE ET AL Re. 19,905
CRANKSHAFT LATHE
Original Filed July 2, 1930 7 Sheets-Sheet 5
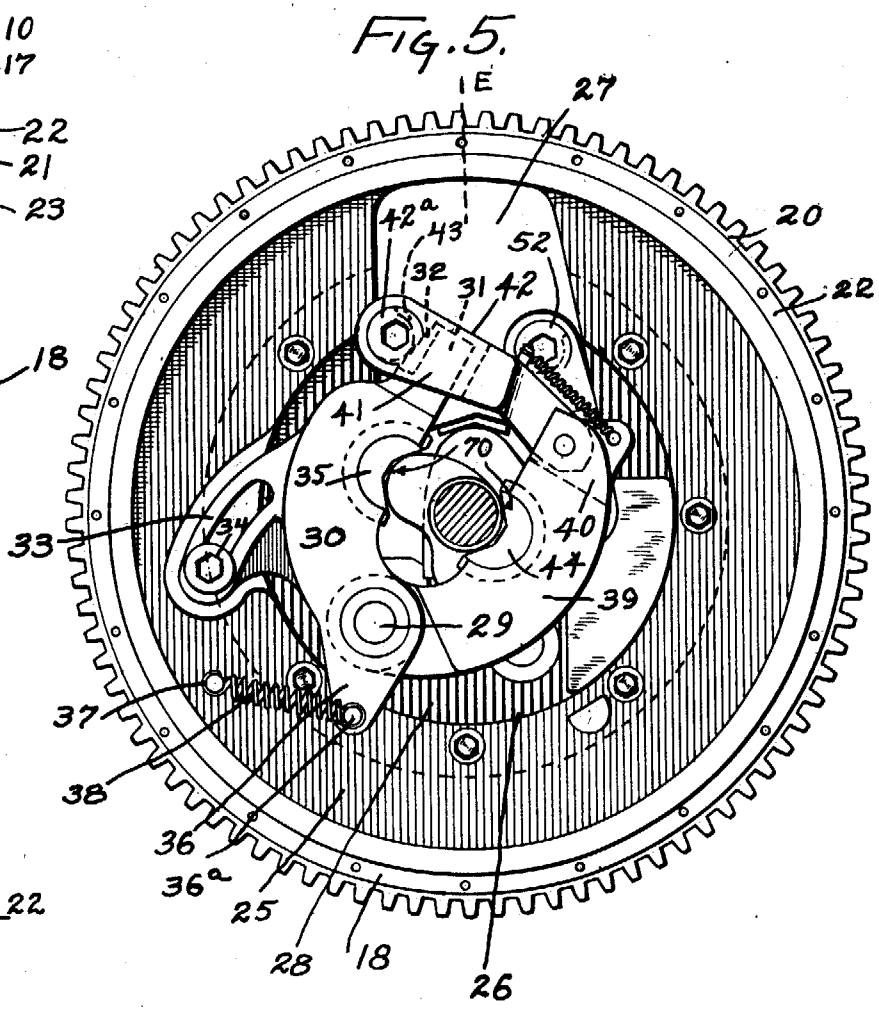
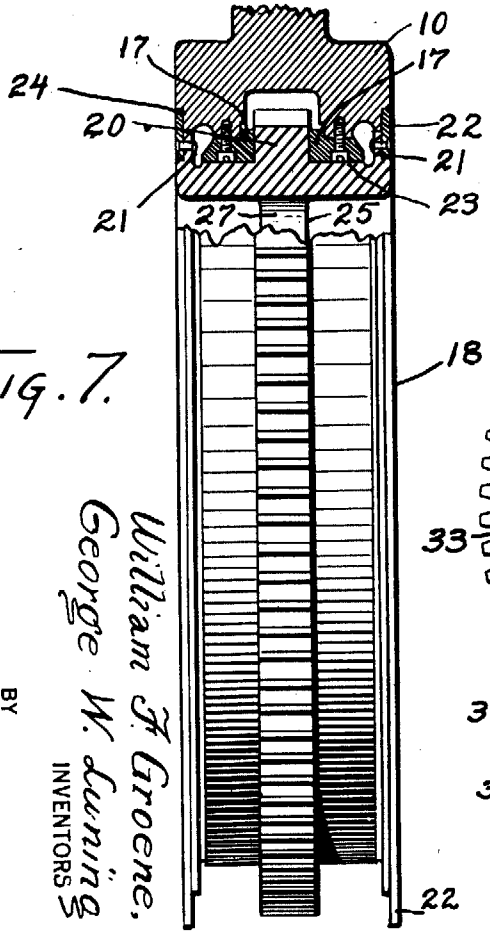
FIG. 7.
William F. Groene,
George W. Luning
INVENTORS
BY
Allen & Allen
ATTORNEYS

CRANKSHAFT LATHE

Original Filed July 2, 1930 7 Sheets-Sheet 6

William F. Groene,
George W. Luning
INVENTOR

BY
Allen & Allen
ATTORNEYS

CRANKSHAFT LATHE

Original Filed July 2, 1930 7 Sheets-Sheet 7

William F. Groene
George W. Luning
INVENTORS

BY
Allen & Allen
ATTORNEYS

Reissued Mar. 31, 1936

Re. 19,905

UNITED STATES PATENT OFFICE 19,905

CRANKSHAFT LATHE

William F. Groene and George W. Luning, Cincinnati, Ohio, assignors to The R. K. Le Blond Machine Tool Company, Cincinnati, Ohio, a corporation of Delaware Original No. 1,934,976, dated November 14, 1933, Serial No. 465,405, July 2, 1930. Application for reissue October 17, 1934, Serial No. 748,720

49 Claims. (Cl. 82—9)

This invention pertains to a class of machines known as crank shaft lathes and has for its purpose, the turning of parts of a crank shaft for an internal combustion engine and more particularly for turning all line bearing and end parts of a crank shaft at one operation.

Heretofore, it has been considered impossible to turn the flange end, the line bearings and the stub end of a crank shaft in one operation, due to the difficulties encountered in holding the work during the turning operations and in preventing torsional strains which tend to throw out of index, the crank pins and other parts of the crank shaft, the work heretofore having been done as separate operations on several lathes.

This tendency to torsional strain and deflection has been overcome in a novel manner in the lathe of this application, both in the means of gripping and holding the shaft and in the tools that work upon the crank shaft, the tools having approach and working positions that counteract the torsional strains set up by each set of tools as they remove the metal.

The lathe has a system of loading (as set forth in the Groene Patent 1,700,721, dated January 29, 1929), which prevents any possible damage to the chucks, centers or tools. It also has a system of feed for the tools from a hydraulic source of power that automatically decreases the rate of feed for the tools as they approach the end of the cut.

The lathe further has a dwell or sizing period, wherein the tools remain without inward or outward travel but in contact with the shaft during a predetermined length of time and then, without effort on the part of the operator, are retraced at rapid traverse to a position of retreat ready for approach to the next shaft and for permitting the unloading and reloading of the machine.

There is also an arrangement, as will be set forth in the specification wherein power for the various movements and operations is controlled automatically and without effort on the part of the operator.

It may be here stated that the hydraulic features of the machine may have their source of power furnished by any one of several commercial types of hydraulic pumps, the particular one herein illustrated being known as the Oilgear pump.

It is to be further understood that certain of the control features of the crank shaft lathe to be described by this specification are linked to control valves in the Oilgear pump, these valves being an integral part of the illustrated pump; and their action will be described, but not illustrated, in this application, they being well known in the art.

In our present machine there is flexibility to the working structure where called for and a high degree of resistance to distorting forces which interfere with accuracy or workmanship, which features are a part of the object of the invention, as will be set forth.

Figure 1:
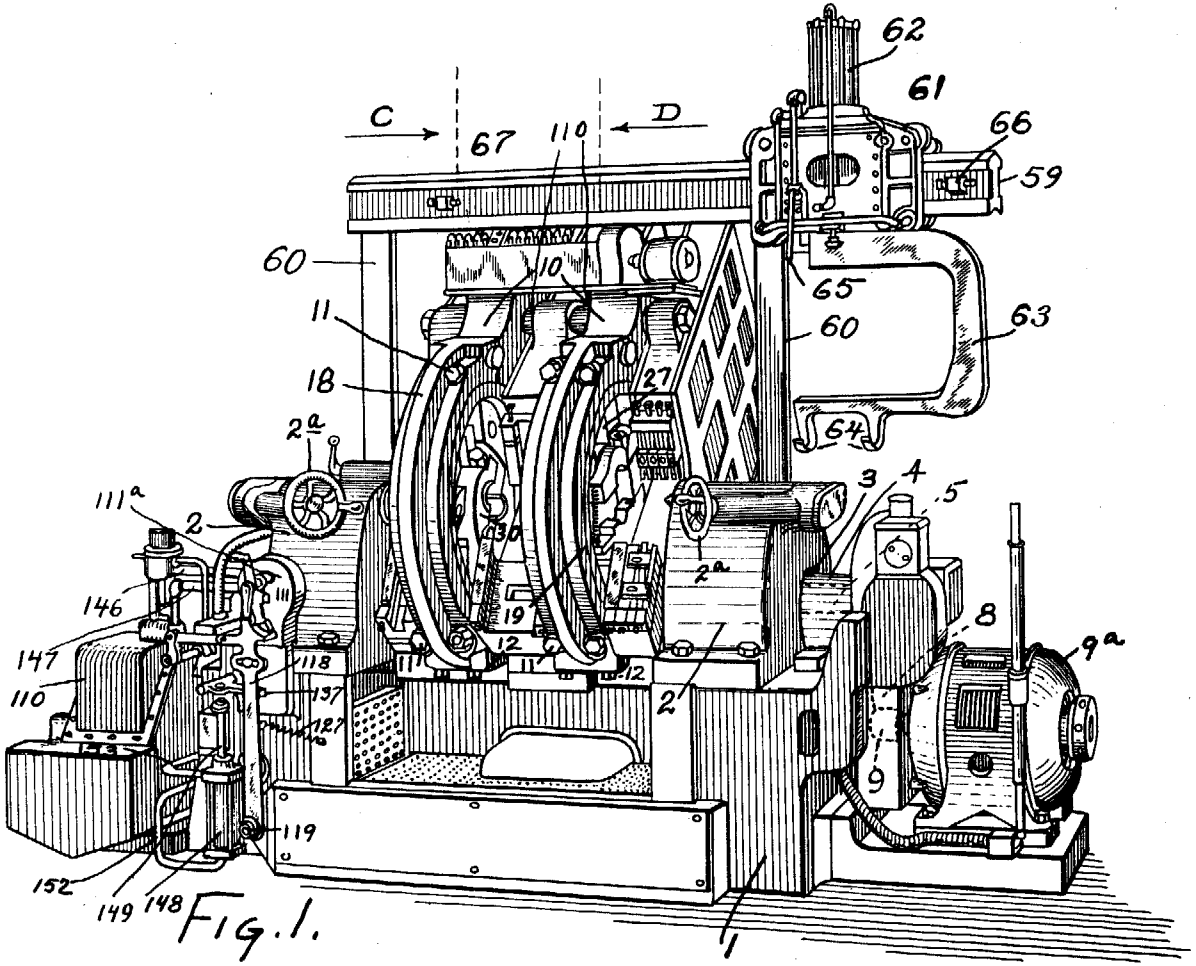
Figure 2:
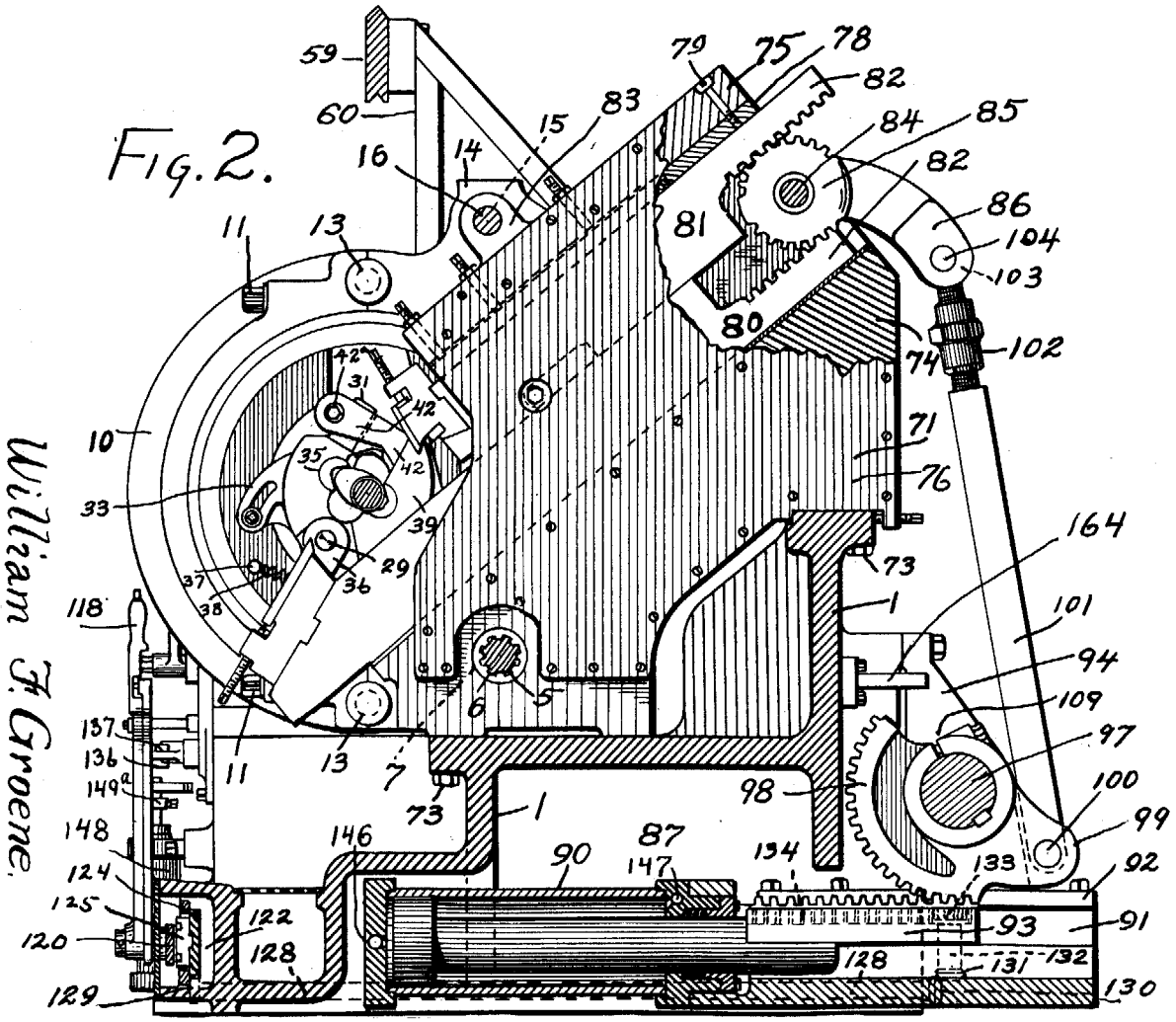
Figure 3:
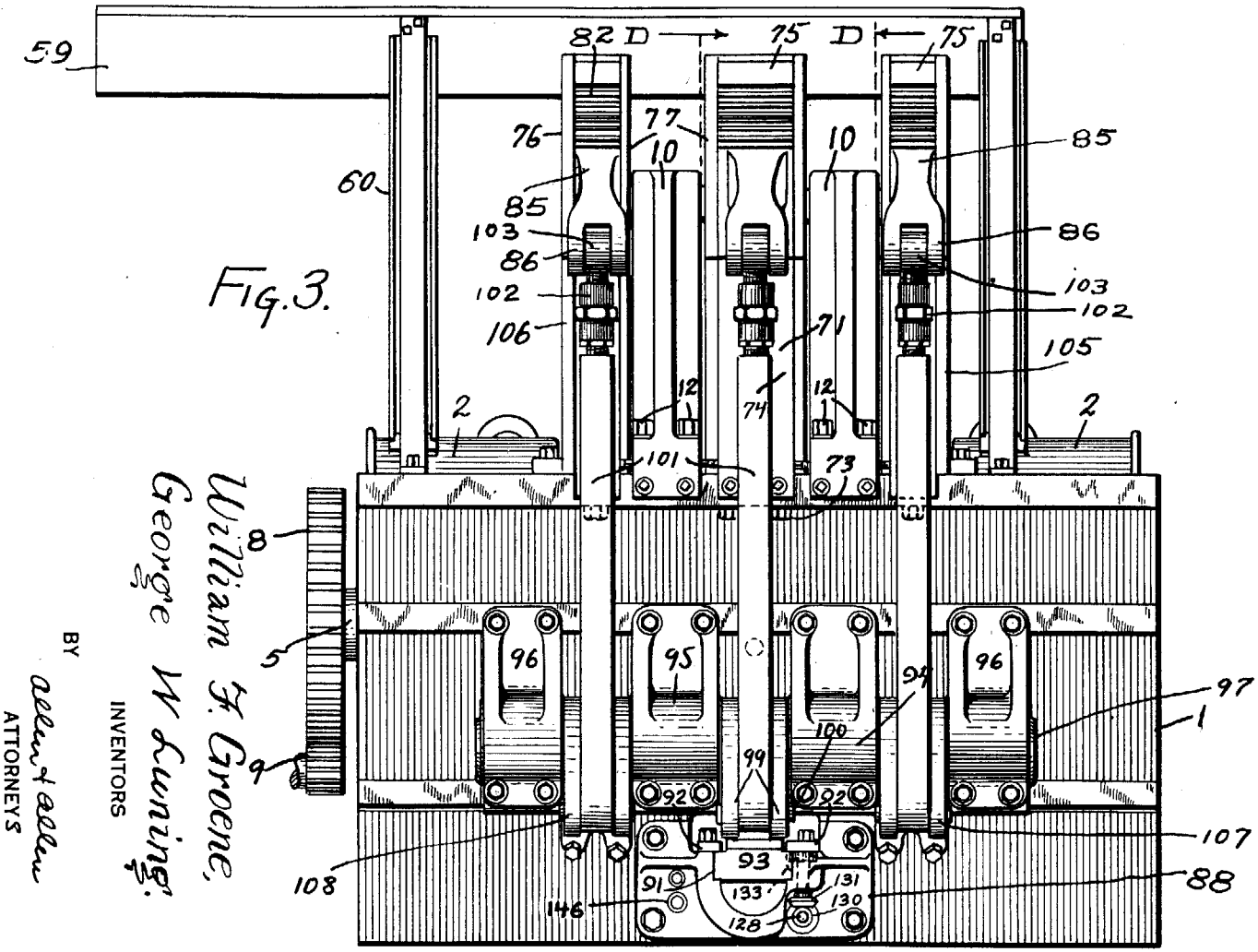
Figure 8:
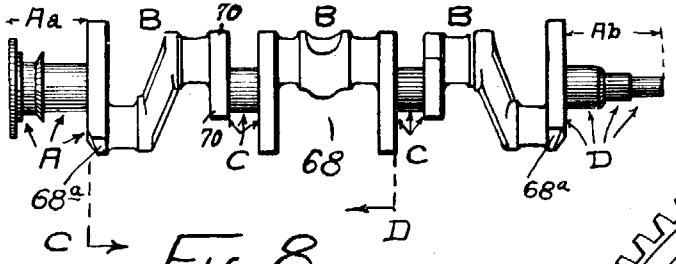

In the particular embodiment of our invention selected for illustration:

Figure 1 is a front elevation, in perspective of our complete machine with all of its accessories, Fig. 2 is a vertical transverse section on line "D" of Figs. 3, 4 and 8, certain of the parts being shown in broken section, Fig. 3 is a rear elevation of the lathe, the pump and motor drives and other accessories being omitted, Fig. 4 is a front elevation of the left end of the bed of the lathe, with the control levers and the pump accessory, Fig. 5 is a side elevation of the right hand side of the left end ring gear chuck body.

Figure 6:
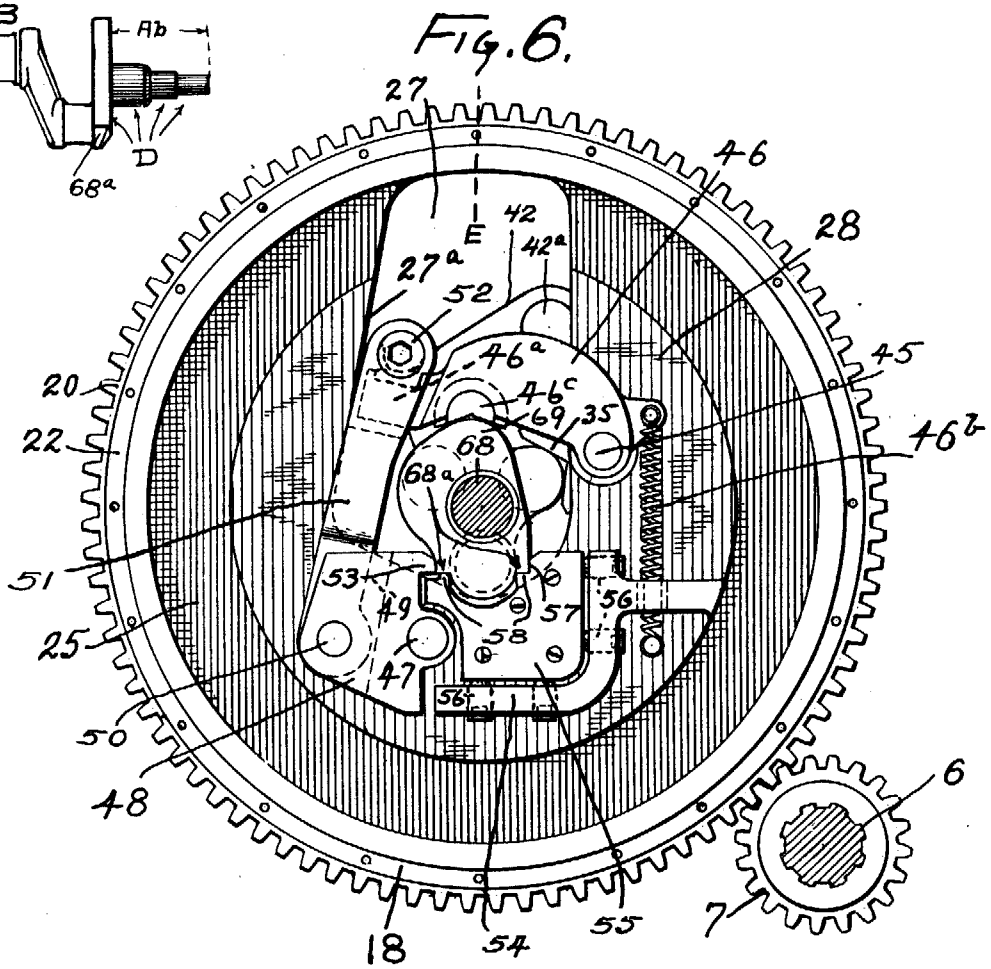
Figure 9:
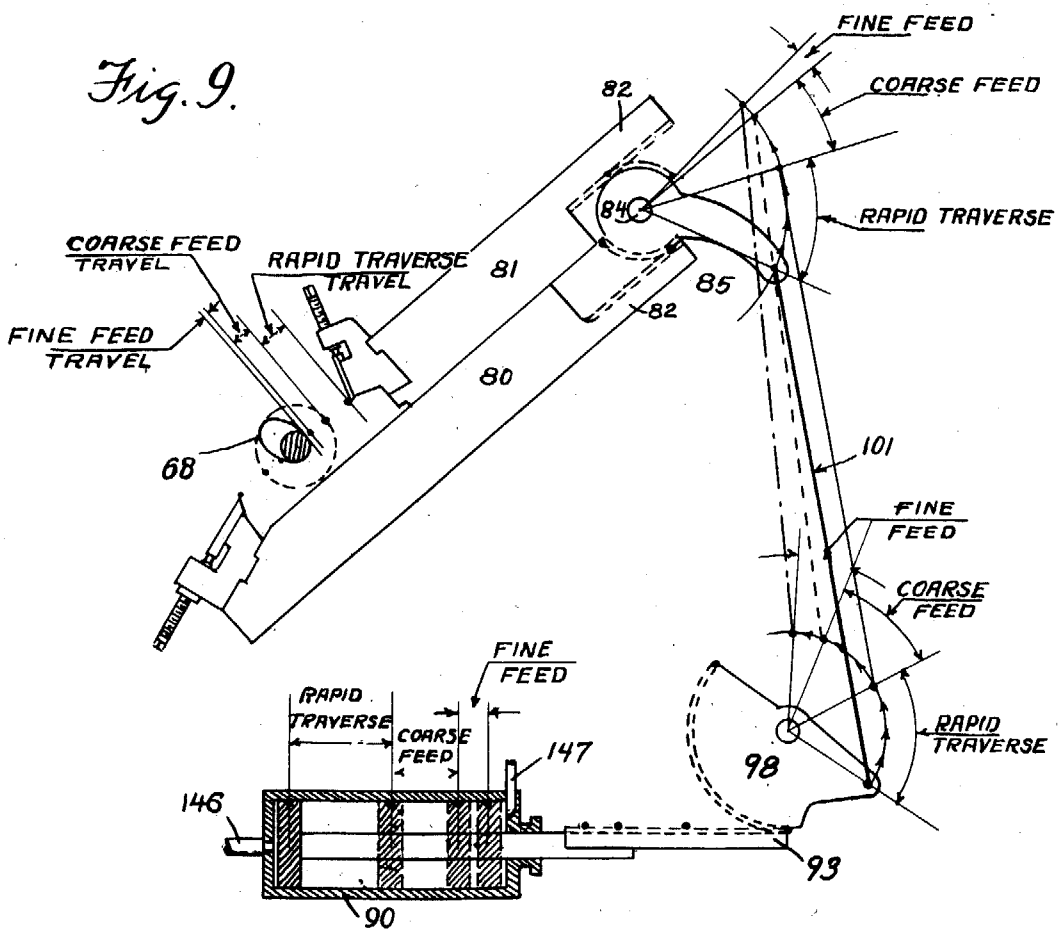

Fig. 6 is a side elevation of the left hand side of the left end ring gear chuck body, the sections being on lines "C" and "D" of Figs. 1, 3, 4 and 8, Fig. 7 is a front elevation of one of the ring gear chucks, part of the rim and its housing being in section on line "E" of Figs. 5 and 6, Fig. 8 is a side elevation of a rough crank shaft forging after it has been turned in our lathe, and Fig. 9 is a diagrammatic layout of the work cycle of the feed for the tools.

Referring now to the drawings, the base of the machine is shown at 1 and the lathe center housings 2 are bolted thereto. Passing through passage ways 3 in the housings 2, and mounted in bearings 4, bolted to the base, is a drive shaft 5, this shaft being splined as at 6, Figs. 2 and 6, where it passes across the lathe, in the space between the housings 2. The shaft passes through a pair of chuck housings 10, and these housings have mounted in bearings in their lower rear edge, pinions 7 for driving the pair of ring gear chucks, these pinions having splined engagement with the shaft 5. The splining of the shaft and the mounting of the pinions in bearings in the chuck housings makes it possible to shift the chuck housings to any position along the shaft if necessary.

The shaft 5 has on its outer right hand end, a large gear wheel 8, this gear in turn meshing with a pinion gear 9, fast on the motor shaft of a motor 9a.

The housings 2 carry the adjustable centers for holding the crank shaft before it is gripped by a pair of driving ring gear chucks. The pair of housings 10 form bearings, as will be described, for a pair of ring gear chucks. The housings 10 are split on their vertical diameters at their center on a line for assembly purposes and are held together when assembled by bolts 11, and are bolted to the bed of the lathe by bolts 12, at the front and rear. These housings at their juncture have a groove in each half for a pin 13, the purpose of which is to align the interior bearing surfaces when the halves are bolted together.

The rear half of the housings carry an upstanding boss 14, having a hole 15 to permit the passage of a tire rod 16. Looking at Fig. 7, the interior construction of the housing is clearly shown. Secured to the interior circumference of the housings and, split as are the housings, are bronze bearing rings 17, furnishing a running surface for the ring gear chucks 18 and 19, Figs. 1, 5, 6 and 7. These ring gear chucks, two in number, are substantially alike and the description of their construction and operation will be confined to the one at the left end of the lathe as shown in Fig. 1, and indicated by the ordinal 18.

These ring gear chucks, used for holding the crank shaft securely in position to be worked on by the tools in conjunction with the centers as will be described, are also the driving means for the crank shaft while it is being turned by the tools.

The construction of these ring gear chucks is obvious by looking at Figs. 5, 6 and 7, being in the form of a wide faced ring having on its outer surface a raised center portion 20, on which the gear teeth are cut, and a pair of flanged edges 21, upon which rings 22 are riveted. Between the flanged edges 21, and the raised center 20, are bearing surfaces 23 fitting in the respective bearing rings 17.

It will be seen, by looking at Fig. 7, that when the housings are assembled around these ring gear chucks, there is formed a circular path for the ring gear chucks to turn upon and that the flanged edges of the chucks together with the rings 22, fitting into grooves 24 in the side faces of the housings, form a dirt resisting joint, preventing, by the tortuous path formed, foreign matter getting into the bearing surfaces of the housing and ring gear chuck.

Looking at Figs. 5, 6 and 7, especially Fig. 5, it is noted that the ring gear chuck has an inwardly extending annular web portion 25 having a central opening 26, and a cutaway portion or gap at 27. The opening 26 in the web 25 is partially closed in each case by plates 28 screwed to the outer side of the ring gear chuck, this plate also having a cutaway portion 27a, Fig. 6, which registers with the clearance space 27 in the web of the ring gear.

Looking now at Fig. 5, which is a view of the right hand side of the left ring gear chuck 18, a stud 29, projects from plate 28. Mounted on this stud is a swinging clamp member 30, which clamp member has a narrowed portion or nose 31, the nose portion having a stepped taper block 32, indicated in dotted line, mounted in one edge. Projecting from the rear edge of the clamp member 30, is a quadrant shaped projection 33, having a slotted center, the slot having in its path a clamp bolt 34. Mounted in the inner edge of the swinging clamp member, is a self adjusting gripping member 35, this gripping member being located so as to grip the web of a crank shaft at a predetermined point. At a point below the center of the stud 29 the clamp member has an extension 36 carrying a pin 36a; and in the web portion of the ring gear web is located a pin 37 and an extension coil spring 38 is attached to the two pins 36 and 37 as shown in the drawings. A second clamp member 39 is mounted on stud 29 and extended upward therefrom opposite clamp member 30, this second clamp member having a slotted upper end 40. Mounted in this slot 40 is a pivoted strain link or bar 41 having a bifurcated end portion 42. Mounted across this bifurcated portion of the strain link, is a pin 42a having a portion at its center partially cut away to form a cam portion 43 shown in dotted line, Fig. 5. The clamp member 39 has mounted in its inner edge a self adjusting gripping member 44, so located as to grip a selected portion of a crank shaft.

Looking now at Fig. 6, which is the opposite side of ring gear chuck 18, the plate 28 has a stud 45 projecting from its face, on which stud is mounted a clamp arm 46, having a nose portion 46a with a stepped taper block similar to that in clamp member 30, on the opposite side of the chuck body. The clamp arm 46 also has a self adjusting grip member 46c where it comes in contact with the upper web portion 69 of the crank shaft. Mounted on a pin 47, projecting from the plate 28, is a swinging grip block 48, having a slotted portion 49, with a pin 50 passing across the slot, and mounted on this pin is a strain link or bar 51, having a cam pin 52, similar in construction to pin 42 in strain link 41. The grip block 48 has a hardened projection 53 for gripping the work.

The plate 28 also has an L-shaped rib 54 at its lower portion, cast integral therewith. Screwed fast to the plate 28 and lying inside the rib 54 is a locating block 55, this block being capable of a fine final adjustment to position by set screws 56 at right angles to each other in rib 54, it only being necessary to loosen small screws passing in the plate 28 through slightly enlarged holes in the block 55 which allow the small movement by the set screws 56 necessary after which the small screws are again tightened. At 57 is a shoulder for a sidewise work locating point and at 58 are flat surfaces used also as work locating points vertically.

The method of placing a crankshaft in the lathe for turning will now be described. Mounted above the ring gear chuck is a rail 59 which is mounted on columns 60 and has a trolley frame 61 adapted to run on the rail tracks. Mounted on the trolley is a fluid pressure cylinder 62 having the usual piston and piston rod, the lower end of the piston rod carrying a hook frame 63, with hooks 64 on its lower edge which are adapted to engage a crank shaft at its midlength. An operating handle for the fluid pressure is shown at 65 and a pair of stops 66 and 67 are mounted on the rail.

All this and certain other details are clearly set forth in a Patent 1,700,721 to Groene, one of the present applicants.

A crank shaft 68 having the two opposite locating places 68a, milled on one edge of each of the end webs, is then placed in the hooks of the crane structure; the trolley is pushed to a position against the stop 67, the crank shaft flange end passing through ring gear chuck 19 and through ring gear chuck 18. When the crane trolley strikes the stop 67, the crank shaft then projects from left of chuck 18 and from the right of chuck 19 the distances, respectively, as shown in Fig. 8 at *Aa* and *Ab*.

In this position, the operator manipulates the valve lever 65 on the trolley 61 and the crank shaft is lowered to position with the locating spots 68*a*, resting on the locating surfaces 58 of the blocks 55. This places the centers of the crank shaft in a direct line with adjustable lathe centers 2 and the operator then manipulates the hand wheels 2*a* running the center pins to seats drilled in the ends of the crank shaft. The crane hooks are then disengaged and it is retracted to its idle position, shown in Fig. 1.

Look now at the right hand side of ring gear chuck 18, as shown in Fig. 5.

The shaft now being located in the position of attack for the tools, is to be clamped to the chucks as drivers, in the following manner. Both clamps, being in idle position are found, the one, 39 down against its stop 39*a* with its clamp bar 42 lying against the inside wall of the ring gear, while the front clamp 30 has been swung forward until the bolt 34 is at the inward extreme of the quadrant slot. It is to be understood that swinging clamp 46 and the strain bar 51 on the opposite or left hand side as shown in Fig. 6 are also retracted, as is the swinging grip block 48, and the elements of the right hand chuck 19 are to be understood as being in like positions, so that the entry of the crank shaft is unobstructed by any of the gripping elements. Looking now at Fig. 6, the left hand side of ring gear chuck 18, the operator will swing the clamp arm 46 down on web portion 69, the spring 46*b* serving as a counterbalance only. He then brings the strain link up over the nose portion 46*a* and then inserts a wrench in the hexagonal socket in the end of the roller cam 52. As this cam is turned the cam portion in the center comes in contact with the inclined portion of the nose 46*a* and it brings to bear great pressure inward at the point where the portion 53 of the swinging grip block tends to move inward, thus clamps the crank shaft at its web portion against the opposite stop shoulder 57. At the same time the clamp arm 46 and its gripping member 46*c* exert a very great pressure downward against portions 58 of the locating block 55.

The operator having firmly gripped the shaft on one side of the ring gear chuck 18, now brings into operation the gripping and driving means of the right hand side of the chuck 18, see Fig. 5. The operator brings both clamp arms 30 and 39, with their gripping means, in contact with the crank shaft, the gripping means engaging the crank shaft web at points 70, Figs. 5 and 8. The clamp members being in position against the enumerated contact points, the strain link 41 is brought forward over the nose 31 of clamp member 30, bringing the roller cam portion of pin 42*a* in contact with the stepped piece 32. The pin is then rotated, bringing the high part of the cam toward the nose piece of clamp lever 30 and thus straining the clamp members toward each other, clamping the crank shaft securely between them, the gripper portions 35 and 44 of the two clamp members, in the course of the operation, having settled firmly into position, adjusting themselves perfectly to the crank shaft. Clamp bolt 34 is then tightened on the slotted segment 33, and the parts are locked in an immovable, driving and holding grip. The above described operations in clamping the crank shaft in the ring gear chuck 18 is repeated for ring gear chuck 19 and the shaft is then ready for the action of the tools.

Looking now at Figs. 1, 2 and 3, a tool frame member 71 is securely bolted to the base 1, by bolts 73, the frames being preferably of the type shown and described in the Groene Patent 1,744,885, being constructed of spacer castings 74 and 75 and side plates 76 and 77, the side plates being fastened to the sides of the upper and lower spacer castings by screws, as shown in Fig. 2. This forms a strong rigid structure with a high narrow tool bar space developed between them. To the bottom of the upper spacer casting is fastened a gib piece 78, this gib piece being fastened by bolts 79 at its rear end and being free for adjustment inward at the end towards the crankshaft, to take up wear in a set of tool bars.

The tool bars 80 and 81 are in the form of wide, flat bars having considerable length and superimposed in relation to each other.

Each tool bar has a toothed, rearward extension 82 and these bars are equipped at their front ends with the usual tool holders and tools as is clearly shown in Figs. 1 and 2. The upper spacer casting 75, has at a point near its front end a lug 83, having a hole for the passage of the tie rod 16 before mentioned.

Mounted in the upper rear part of each of the tool frames is a short shaft 84, to which is secured a toothed lever arm 85 with a bifurcated outer end 86. The toothed portion of the arm 86 engages the rack or toothed extensions of the tool bars 82 and is adapted, when rocked, to feed the tool bars and their tools in toward the work and to retract them therefrom.

It is also to be noted, looking at Figs. 1 and 3, that the center tool bars are of wider construction than those of the two ends, but that otherwise, the construction is the same.

The method and means for feeding the tool bars and their tools, will now be described. Looking with special reference to Figs. 2 and 3, the base 1 has about midway of its length a recess 87, the opening of which is covered by a flanged casting 88, having rearward and forward extensions. Secured to the rearward extension and lying within the recess 87, is a cylinder 90, having the usual piston and piston rod and with the usual admission ports in each end for the admission and exhaust of fluid. The extensions of the flanged casting 87, have recesses or slide ways 91 in each side, which ways have a gib piece 92 extending over part of the recesses forming a guide way for a toothed rack segment 93, the rack segment forming a continuation of the piston rod and being fastened thereto, and, to all intents and purposes, an integral part thereof.

It is manifest that any movement of the piston and piston rod will cause the rack segment 93 to slide in the ways 91.

Secured to the rear of the base 1 in any suitable manner are brackets 94 and 95, these brackets and brackets 96, serving as a support for a heavy shaft 97. Keyed to this shaft at a point central to its length, is a toothed segment arm 98 having a bifurcated projecting extension 99 bored to receive a pin 100. The toothed part of the segment arm 98 is in meshing contact with the teeth of the rack 93. A connecting link bar 101 is in the form of a heavy square bar of steel, having at its upper end a turnbuckle 102, the outer one of the members of the turnbuckle having an eye 103. The end 86 of the toothed lever arm has a bearing for a pin 104 passing through the eye 103 of the link bar 101 and thus connecting a source of power to the middle tool bars and the tools.

It will be noted in Fig. 3, that the construction of the tool bar connections to the outer tool units 105 and 106 are the same as the one above described, with this exception, the arms 107 and 108 instead of having the toothed sector 96, are simple lever arms keyed to shaft 97. It is to be noted that in addition to being keyed to shaft 97 all the arms are split at one side as at 109, and clamped to the shaft by bolts, thus giving a construction capable of standing the great strains encountered in accomplishing the novel results of this machine.

Looking at Fig. 2, it is seen that, presuming the crank shaft is in rotation from any source of power applied to the drive shaft 5, (in this machine, a motor) if fluid pressure be admitted to the cylinder 90 at the left hand end, the piston will start forward, carrying with it the rack 93, which in turn revolves the toothed segment arm 96, turning the shaft 97 and with it the arms 107 and 108, setting into motion the lever arms 85, and, through their toothed connection to the tool bars 81, 82 the tool bars advance toward the revolving crank shaft.

It is also to be noted that when the chuck frames and the tool frames are all mounted on the bed 1, that the bosses or lugs 14 for the chuck housings and bosses or lugs 83 for the tool frames are in line, and at this time the tie rod 16, threaded at both ends, is passed through the lugs, spacer bushings 110 being placed on the rods between the lugs so that when nuts are placed on the projecting ends of the tie rod and screwed down, the chuck housings and tool frames are securely clamped together thus preventing the stresses of operation from disarranging their spacing and adjustment and offering decided resistance to the spreading of the units when they are under work conditions.

Looking now at Fig. 4:—

The Oilgear pump unit is shown at 110. A brief general statement of the characteristics of this pump, a commercial product, is believed to be all that is necessary for a clear understanding of the power output and control thereof, as it is used in the machine of this application.

This pump has the capacity for supplying a rapid traverse and a series of adjustable feeds, forward and reverse, and consists of a high pressure variable delivery pump, a low pressure constant delivery gear pump, a control valve and a feed adjusting mechanism, all contained in one unit. The high pressure variable delivery pump is variable from 0 to 550 cubic inches per minute at a maximum pressure of 1000 lbs. per square inch, and the low pressure gear pump has a constant delivery of 3600 cubic inches per minute at a maximum pressure of 300 lbs. per square inch.

The pump is driven by separate electric motor which is in constant operation irrespective of the idle moments of the crank shaft machine of which it is an auxiliary.

Proceeding now with Fig. 4, a bracket 111 is bolted to the side of the base and carries an electric switch 111*a*, which is provided with a handle 112 pivoted at 113. The shaft of switch 111*a* has a gear sector 114 fixed on it, and the handle 112 has a gear sector 115 meshing with the switch sector 114. This construction gives a quick operation to the contacts within the switch as is usual in this type of switch, which is well known commercially. The lever 112 has on its lower right side a lug 116 having a face in the form of an arc struck from the lever center, this lug having a slot 117 in said face.

A second lever 118, pivoted at 119 on the bed 1, has an extension 120, extending to the right from its pivot 119 and carrying a pin 121 in its outer end.

Located in a pocket 122, in the front of the base of the machine are gibs 123, forming a guide way for a cam carrying slide 124 on whose face is mounted a cam plate 125, the slide having rack teeth 126 on its lower edge. A spring 127 is so connected to lever 118 as to hold the lever extension 120 downward.

Looking now at Figs. 2, 3 and 4 for a moment:—

A shaft 128 extends from the recess 122 to a point outside the bed at the rear of the machine; a pinion gear 129 being secured on the front end and projecting in to the recess 122. At the opposite end, Fig. 2, to the rear of the machine is a bevel gear 130 meshing with a bevel gear 131 mounted on a short vertical shaft 132 in a bearing in the casting 88, this short shaft having a pinion 133 fast on its upper end in turn meshing with a rack 134 cut in the side of the rack bar 93.

Returning now to Fig. 4, it is to be noted that the pinion gear 129 is in engagement with the rack on the bottom of the cam carrying slide 124, and in this particular machine, the ratio between the rack segment 93 and the slide 124 is one to one, so that the same distances are traveled by the rack bar 93 and the cam carrying slide 124 whenever the rack segment is moved in either direction.

Lever 118 has near its mid-length a pin 135 having a flat side 136 vertically where it projects from the lever 118, the flat side facing towards the right in Fig. 4. Mounted on a pivot on plate 111 is a latch 137, the right hand end of the latch lying on the pin 135 and having a left hand facing ledge or hook 138 adapted at certain positions of the latch, to engage the pin 135 at the right hand facing flattened portion 136. This latch also has a forwardly projecting lug 139 having a hole 140.

At a point near the handle portion, lever 118 has an arm 141, projecting to the left. Connected to this arm is a link 142 engaging the top part of a double lever 143 carried in a bracket on the end of the bed 1, the lower end of the lever having a link 144 engaging with the control valve stem 145 of the Oilgear pump 110.

Leading from the Oilgear pump 110 is a pressure line 146 connecting with the left hand or rear end of the cylinder 90, and carrying to the cylinder the fluid pressure from either the gear pump or from the variable delivery pump, situated in the pump casing, according to the position of the valve, the various positions of the valve being determined by the position of the lever 118 either when it is moved by hand or by the cam plate 125 as will be explained presently.

Leading also from the pump is a fluid pressure line 147 which is connected to the right hand or forward end of cylinder 90.

Mounted on the front of the base 1 is a pressure cylinder 148 having a piston and piston rod 149, the piston rod carrying near its upper end an adjustable collar 149*a*.

A high pressure relief valve 150 is connected into line 146, this relief valve discharging into a second relief valve 151. Having a lower pressure setting, this low pressure relief valve 151 discharges into the supply tank in the base of the pump, the line 152 leading from the relief valve 150 to relief valve 151 being also continued to the lower end of the cylinder 147.

The top of cylinder 148, has a line 153 leading into line 147.

Presume now the Oilgear pump motor in operation and the pump ready to deliver pressure from either the gear pump or the variable speed pump and presume that the crank shaft is turning under the influence of its power plant, and that lever 112 is in running position at the right, thus bringing slot 117 in lug 116 on the lever 112 in line with safety pin 117a on lever 118. This releases lever 118 for the movement, and the operator then moves lever 118 to the extreme left, moving the valve on the Oilgear unit and admitting oil to the system of pipes 146, 147 and their accessories. The oil pressure first admitted is from the gear pump section of the pump unit and is of lower pressure, approximately 300 lbs. per square inch and of large volume. The first action of this oil pressure is to move the piston in cylinder 90 (Figs. 4 and 9) to the right at rapid traverse. The first result of this rapid movement is that the rack 93 moves the distance shown in the diagram, Fig. 9, and marked "rapid traverse." When this movement takes place, the pin 121, Fig. 4, enters the section of the slot in the cam plate 125 indicated by ordinal 163, where it rides as the cam plate moves to the right under the influence of the pinion gear 129 and its drive. When the cam plate in its travel to the right reaches the point where section 154 of the cam begins, the pin is depressed by the dip in the cam and the lever 118 is shifted to the right far enough to cut out the gear pump supply and brings into action the supply from the variable feed section of the pump 110. During the rapid traverse movement an inspection of Figs. 2 and 9 will show that the tool bars and tools have moved in toward the work, at rapid traverse, the distance indicated in Fig. 9. At this point the speed of the piston travel inward is at a predetermined accomplished rate of speed, by a setting of the pump valve. It is also to be noted from a careful inspection of the diagram, Fig. 9, that while the rate of piston speed remains constant for a given distance of travel, the rate of feed for the tools from this point to the finish is gradually, automatically, being reduced from the rate of feed furnished by the speed of piston travel to a rate furnished by the combination presented by the toothed segment arm 98, link bar 101 and the lever arm 85. As the segment 98 approaches the zenith of rise of its arc, the lift on the link bar 101 becomes less and less and as it is with the segment 98, so, also it is with the lever arm 85 which is also reaching toward the zenith of its travel and in consequence of the decrease in angularity of the arc of the centers from the vertical, the last step of the feed of the tools is reduced to a very limited movement inward in contrast to the degree of travel of the piston in cylinder 90.

Resuming consideration of the movement of the piston in cylinder 90 and the cam plate, the pin 121 having reached the second dip in the cam down which it travels to the section of the slot marked 155, which is the fine feed section for the feed of the tools, the movement of the pin down the last incline correspondingly moves lever 118 further to the right, and effects a new setting of the pump valve, still further cutting down the variable delivery pump delivery.

All the above tends to a gradually slowing, fine feed for the tools while turning the bearings of the crank shaft, the coarse feed being used to turn the cheeks of the webs. Note in Fig. 4 an adjustable strip 156, which forms one side of the slot in section 155 of the cam. By adjustment the cam may be brought in perfect time with a stop 164 (Figs. 2 and 3) mounted on the rear of the base 1 in line with the central link bar 101. When the link bar 101 strikes the stop 164 the piston has almost reached the end of its travel to the right and the further advance of the piston is stopped and with it, the further feed of the tools ceases; the pin 121 in the cam slot coming to a stop just clear of the end of the adjustable strip 156. During the time the lever 118 was to the left, the latch 137 has been riding on the top of the straight sided pin in lever 118. As the lever moved to the right, the latch finally came into engagement with the pin, this occurring just before the pin 121 reached the tip of the slot in section 155 of the cam plate, the latched lever preventing the pin from dropping just as the feeding movement of the tools ceases. This leaves the tools in contact with the still turning crankshaft which is desirable for the purpose of sizing the pins, and for removing all tool marks.

When the piston stops, the pump continues to run at its last variable setting, and the pressure then commences to build up in the line 146, and when it reaches a predetermined point, relief valve 150 opens and the fluid passes through line 152 to the piston of the cylinder 148. During the entire period of the forward feeding cycle of cylinder 90 there is a low back pressure in lines 147 and 153, which pressure is exerted on the upper or rod end of the piston in cylinder 148. A second low pressure relief valve 151 in line 152 is set at a slightly greater pressure than the pressure existing in line 153 during the forward feeding cycle above mentioned. Thus fluid escaping through relief valve 150 will build up sufficient pressure in line 152 to overcome pressure in line 153, so as to cause the piston rod 149 with adjustable collar 149a to rise until the end of the rod passes into the hole 140 in the lug of the latch 137.

When the collar strikes the lug 139, the latch releases the lever 118 and it is retracted past the central neutral point until the pin 121 on lever extension 120 drops to the bottom of the cam plate groove. At the same time the variable delivery pump is cut out by the valve on the pump unit and the gear pump cut in as rapid traverse reverse. The direction of flow and the pressures are then reversed in the main lines 146 and 147. The pressure in line 146 is reduced to very low degree, the fluid returning into pump 110 by being exhausted from port 146 of master cylinder 90. The pressure builds up in lines 147 and 153 greater than in line 146 and also greater than the setting of the relief valve 151. The result is that the piston in cylinder 90 is returned to the location shown in Fig. 2, thus retracting the tools at rapid traverse. Also, since pressure in line 153 is in excess of pressure setting relief valve 151, piston rod 149 in cylinder 148 will be returned to its down position, exhausting the fluid in the lower end of this cylinder through the relief valve 151.

When the pin 121 is reached by the cam surface at the end of cam plate 125, the lever is returned to the neutral position. When the lever 118 passes the center when released by the latch, the pin 117a passes out of the slot 117 in lever 112 and this lever is returned to the stop position for the machine motor, thus stopping the chucks and the crank shaft. When the lever 112 reaches the neutral center position, the tools stop, the Oilgear pump is in neutral and the machine is ready for unloading.

The method of determining the time and amount of dwell of the tools for the purpose of sizing the pins and removing the tool marks and eccentricity therefrom, involves a consideration of the distance of the upward travel of the piston rod 149 with its collar 149a in unit time, which distance is known, as also is the number of revolutions of the work past the tools in unit time, which makes it easy to compute the number of revolutions of dwell of the tools relative to a given upward travel of rod 149. Thus the desired time of dwell of the tools is provided by adjusting the effective stroke of the rod 149, in this case by the desired location of the trip collar 149a.

After the tools have been returned from operating position and stopped automatically in their returned position as above described, the chucks are released, the crane is run in and lowered and has its hooks engaged with the shaft. The centers are run back, and the crane is operated to raise the shaft and run it to removal position to the right. The machine is then ready to be loaded for another cycle of operation.

The finished shaft is shown in Fig. 8. The parts shaded are those finished by the machine, being the flange A, the center bearings C, C, and the stub end D. The rough unfinished portions of the forging are indicated at B, B, B. It will be noted that the cheeks of the webs adjacent the turned cylindrical portions also are finished. This view also shows the finished areas of the sides of the webs, providing locating surfaces definitely related to a proper axis of the cylindrical portions, for locating the axis relative to the axis of the chucks, both longitudinally and transversely of the webs. It will be understood that after the chucks are clamped, with these locating surfaces bearing firmly on the locating surfaces of the chucks, the centers are relieved of the duty of holding the work piece in axial alinement with the chucks. Such a set up is far more reliable than one depending upon the centers, which at best have only limited areas of contact with the edges of the centering holes in the ends of the shaft. The centers are chiefly useful in holding the shaft preliminary to the gripping by the chucks.

Such locating areas on the sides of the webs, being limited in extent, permit of great clamping pressure and also a maximum of accuracy as compared with entirely finishing the sides and ends of webs, as was practised in early days before crank shaft forgings could be made of such close dimensions as at present, and required entire finishing for proper balance. Such locating also may be had, independent of the shapes of the webs.

What we claim as new and desire to secure by Letters Patent is:

1. A crank shaft lathe having in combination, means for holding a crank shaft in working position, tools adapted to be fed to the crank shaft, hydraulically operated mechanical means for feeding the tools toward the work rapidly to a point near the work, and said mechanical means having a movement reducing the rate of speed of feed of the tools when near the work with a constant supply of fluid to said hydraulic operating means.

2. A crank shaft lathe having in combination, means for holding a crank shaft in working position, tools adapted to be fed to the crank shaft, means for feeding the tools toward the work rapidly to a point near the work, said means comprising a combination of hydraulic and mechanical feeding means, said mechanical means having a movement for reducing the rate of speed of feed of the tools when near the work with a constant supply of fluid to the hydraulic portion of the feed actuating means.

3. A crank shaft lathe having in combination, means for holding a crank shaft in working position, tools adapted to be fed to said crank shaft, and means having an arcuate motion for feeding the tools toward the work rapidly to a point near the work, and a succeeding arcuate motion for reducing the rate of speed of feed of the tools when engaging the work for turning the bearings, and means for maintaining the tools at substantially the same radial distance for a definite period in which the bearings are sized and the tool marks removed.

4. A crank shaft lathe having in combination, means for holding a crank shaft in working position, tools adapted to be fed to said crank shaft, and means having an arcuate motion for feeding the tools toward the work rapidly to a point near the work, and a succeeding arcuate motion for reducing the rate of speed of feed of the tools when engaging the work for turning the bearings, means for maintaining the tools at substantially the same radial distance for a definite period in which the bearings are sized and the tool marks removed, and means for rapidly withdrawing the tools from the work.

5. A crank shaft lathe having in combination, means for holding a crank shaft in working position, tools adapted to be fed to the crank shaft, a cylinder and piston hydraulically actuated for feeding the tools to the work, having a connection to the tools with an arcuate movement feeding the tools toward the work rapidly to a point near the work, and reducing the rate of feed of the tools when near the work with uniform rate of travel of the hydraulically operated piston.

6. A lathe comprising a movable tool a hydraulic cylinder and a piston operating therein, a member driven thereby having a curved path of travel, and a connection from said member to the tool arranged so that the arc of movement of said member is so positioned relative to the path of the tool that said member provides variation in the speed of the tool movement when the piston in said cylinder moves at a substantially constant rate of speed.

7. In a crank shaft lathe, chucks to hold a crank shaft with its line bearings axially displaced from the chucks, tools slidable to and from the respective line bearings, fluid-actuated means to slide said tools, means to supply fluid under pressure to said fluid-actuated means, a cam member moved by said fluid-actuated means, a valve controlling said fluid-supply means, an operative connection from said cam to said valve, a latch for said connection, and fluid-actuated means to release said latch at a predetermined stage of operation of said cam member.

8. In a crank shaft lathe, chucks to hold a crank shaft with its line bearings axially displaced from the chucks, tools slidable to and from the respective line bearings, fluid-actuated means to slide said tools, a plurality of means to supply fluid under pressure to said fluid-actuated means, each supply means supplying fluid under a different pressure, a cam member moved by said fluid actuated means a valve controlling said fluid supply means, an operative connection from said cam to said valve to apply the different fluid pressures, a latch for said connection, and fluid-actuated means to release said latch at a predetermined stage of operation of said cam member.

9. In a crank shaft lathe, chucks to hold a crank shaft with its line bearings axially displaced from the chucks, tools slidable to and from the respective line bearings, fluid-actuated means to slide said tools, means to supply fluid under pressure to said fluid-actuated means, a cam member moved by said fluid-actuated means, a valve controlling said fluid-supply means, an operative connection from said cam to said valve, a latch for said connection, and fluid-actuated means to release said latch at a predetermined stage of operation of said cam member, and a relief valve for the last mentioned fluid-actuated means.

10. In a crank shaft lathe, chucks to hold a crankshaft with its line bearings axially displaced from the chucks, tools slidable to and from the respective line bearings, fluid-actuated means to slide said tools, means to supply fluid under relatively low pressure to said fluid-actuated means, means to supply fluid under relatively high pressure to said fluid-actuated means, a cam member moved by said fluid-actuated means, a valve controlling said fluid-supply means, and an operative connection from said cam to said valve.

11. In a crank shaft lathe, chucks to hold a crank shaft with its line bearings axially displaced from said chucks, tools slidable to and from the respective line bearings, fluid-actuated means to slide said tools, means to supply fluid under relatively low pressure to said fluid-actuated means, means to supply fluid under different relatively high pressures to said fluid-actuated means, a cam member moved by said fluid-actuated means, a valve controlling flow of fluid from one or the other of said fluid-supply means, and at one or another pressure from the second mentioned supply means, and an operative connection from said cam to said valve.

12. In a crank shaft lathe, chucks to hold a crank shaft with its line bearings axially displaced from the chucks, tools slidable to and from the respective line bearings, fluid-actuated means to slide said tools, means to supply fluid under relatively low pressure to said fluid-actuated means, means to supply fluid under relatively high pressure to said fluid-actuated means, a cam member moved by said fluid actuated means, a valve controlling said fluid-supply means, an operative connection from said cam to said valve, a latch for said connection, and fluid-actuated means to release said latch at a predetermined stage of operation of said cam member.

13. In a crank shaft lathe, chucks to hold a crank shaft with its line bearings axially displaced from the chucks, tools slidable to and from the respective line bearings, fluid-actuated means to slide said tools, means to supply fluid under relatively low pressure to said fluid-actuated means, means to supply fluid under different relatively high pressures to said fluid-actuated means, a cam member moved by said fluid-actuated means, a valve controlling flow of fluid from one or the other of said fluid-supply means, and at one or another pressure from the second mentioned supply means, an operative connection from said cam to said valve, a latch for said connection, and fluid-actuated means to release said latch at a predetermined stage of operation of said cam member.

14. In a crank shaft lathe, chucks to hold a crank shaft with its line bearings axially displaced from the chucks, tools slidable to and from the respective line bearings, mechanism operating to provide successively a rapid traverse, a coarse feed and a fine feed, and a source of power distinct from that operating said chucks, for operating said mechanism.

15. In a machine tool, a movable work holder, a tool, fluid-actuated means to feed said tool toward the work, means for stoppage of the feeding, and means adjustable for a longer or shorter continued application of actuating fluid after said stoppage causing later or earlier return of the tool from the work.

16. In a machine tool, a movable work holder, a tool, fluid-actuated means to feed the tool toward the work, a cam member moved by said means, a valve controlling the fluid actuation, an operative connection whereby said cam member operates said valve, a latch maintaining the position of said connection independently of said cam, means to stop the feeding, and means whereby continued application of actuating fluid after said stoppage releases said latch and thereby determines the time of return of said tool from the work.

17. In a machine tool, a movable work holder, a tool, fluid-actuated means to feed the tool toward the work, a cam member moved by said means, a valve controlling the fluid actuation, an operative connection whereby said cam member operates said valve, a latch maintaining the position of said connection independently of said cam, means to stop the feeding, a fluid-actuated device to release said latch, means to divert fluid to said device after said stoppage, causing release of said latch for return of the tool from the work, and relief means for said latch releasing device, determining the rate of operation of said releasing device and the time of return of the tool from the work.

18. In a crank shaft lathe, chucks to hold a crank shaft with its line bearings axially displaced from the chucks, a source of power for operating said chucks, tools movable to and from the respective line bearings, mechanism operating to provide successively a rapid traverse, a coarse feed, a fine feed, and a dwell of the tools, and a source of power distinct from that operating the chucks, for operating said mechanism.

19. In a crank shaft lathe, chucks to hold a crank shaft with its line bearings axially displaced from the chucks, tools movable to and from the respective line bearings, and means to feed said tools comprising a single mechanism mechanically connected to all of the tools and fluid-actuated means mechanically connected to said single mechanism.

20. In a crank shaft lathe, means for chucking a crank shaft having a plurality of bearings, a plurality of tools to turn the respective bearings, a single hydraulic motive means, a shaft rotated by said motive means and a plurality of mechanical operative connections from said shaft to the respective tools for feeding said tools to said bearings.

21. In a crank shaft lathe, means for chucking a crank shaft having a plurality of bearings, a plurality of tools to turn the respective bearings, a single hydraulic motive means, a shaft rotated by said motive means and a plurality of mechanical lever and link connections from said motive means to the respective tools for feeding said tools to the bearings.

22. In a crank shaft lathe, a plurality of chucks each comprising means for gripping the two crank webs between line bearings of a crank shaft, tools mounted to feed to said line bearings at the sides of the chucks, a single hydraulic motive means, and a plurality of mechanical operative connections from said motive means to the respective tools for feeding said tools to the bearings.

23. In a crank shaft lathe, a chuck comprising an outer rim, means on said rim for rotating said chuck, a locating block and pivoted clamping members within said rim on one side of said chuck, pivoted clamping members within said rim on the other side of said chuck, means for drawing said clamping members together at the opposite sides of the chuck, the interior of said chuck being open between the two sets of clamping members at its opposite sides, and the means for drawing the clamping members together being adapted to be opened, whereby a crank shaft may be placed through said chuck with a crank in the opening thereof and having one web held against said locating block by the adjacent clamping members and the other web held between the clamping members at the opposite side of the chuck, exposing the line bearings of the crank shaft for turning, at the opposite sides of the chuck.

24. In a lathe comprising tool means and chucks relatively rotatable for turning the line bearings of a crank shaft having pairs of webs between line bearings, clamp devices comprised in said chucks to hold the shaft by clamping the respective pairs of webs, said clamp devices being so restricted in extent axially of the shaft as to expose all of the line bearings of the shaft for access of said tool means to said line bearings.

25. In a lathe comprising tool means and chucks relatively rotatable for turning the line bearings of a crank shaft having variously radially extended webs between line bearings, clamp devices comprised in said chucks to hold the shaft by clamping the respective webs, said clamp devices being variously radially positioned in said chucks to clamp the respective variously extended webs, and being so restricted in extent axially of the shaft as to expose all of the line bearings of the shaft for access of said tool means to said line bearings.

26. In a lathe comprising tool means and chucks relatively rotatable for turning the line bearings of a crank shaft having variously shaped and variously radially extended webs between line bearings, clamp devices comprised in said chucks to hold the shaft by clamping the respective webs, said clamp devices being variously shaped and variously radially positioned in said chucks to clamp the respective variously shaped and variously extended webs, and being so restricted in extent axially of the shaft as to expose all of the line bearings of the shaft for access of said tool means to said line bearings.

27. In a lathe comprising tool means and chucks relatively rotatable for turning the line bearings of a crank shaft having pairs of webs between line bearings, each web of a pair being differently shaped and differently radially extended, clamp devices comprised in said chucks, a pair of said clamp devices being in each chuck, and each device of a pair being at a respective side of the chuck and being differently shaped and differently radially extended to clamp the webs of a respective pair, and being so restricted in extent axially of the shaft as to expose all of the line bearings of the shaft for access of said tool means to said line bearings.

28. In a lathe comprising tool means and chucks relatively rotatable for turning cylindrical portions of a crank shaft having pairs of webs between cylindrical portions, means comprised in each chuck, having abutment surfaces to engage respective surfaces on a side of at least one of said webs of each pair, one abutment surface facing along the diametral length of the respective web to properly locate the cylindrical portions in the chucks along the length of the web, and the other abutment surface facing inward transversely of the respective web to properly locate said cylindrical portions in the chuck along a line transverse to the web, and clamp devices comprised in said chucks to hold the shaft by clamping the respective pairs of webs with said abutment surfaces sustaining the clamping pressure, said clamp devices being so restricted in extent axially of the shaft as to expose all of a series of axially alined cylindrical portions for turning.

29. In a chucking device to hold a crank shaft for turning a cylindrical portion of the shaft adjacent to a web of the shaft, a chuck body, abutment means on said body to engage a finished area on a side of the web, which area faces along the diametral length of the web, to properly locate the cylindrical portion in the device along the length of the web, spaced abutment means on said body to engage respective areas on opposite sides of the web, which areas face outwardly transversely of the web, to properly locate said cylindrical portion in the device along a line transverse to the web, and means to hold the device and the shaft together with said web areas and abutment means in effective location-maintaining contact.

30. In a chucking device to hold a crank shaft for turning cylindrical portions of the shaft with the shaft substantially free from torsional distortion, by engagement with web portions thereof of spaced longitudinally thereof, chuck bodies mounted and connected for synchronous rotation, each body having abutment means thereon to engage a finished area on a side of a respective web, which area faces along the diametral length of the web, to properly locate the cylindrical portions in the device along said length of the web, and each body having spaced abutment means thereon to engage respective areas on opposite sides of the web, which areas face outwardly transversely of the web, to properly locate the cylindrical portions in the device along lines transverse to the respective webs, and means associated with the respective chuck bodies to hold the bodies and the shaft together with said web areas and abutment means in effective location-maintaining contact.

31. The method of chucking a crank shaft for turning a cylindrical portion of the shaft adjacent to a web of the shaft, which comprises finishing an area on a side of the web, which area faces along the diametral length of the web in a definite relation to a proper axis of said cylindrical portion, finishing an area on a side of said web, which area faces outwardly transversely of the web in a definite relation to said proper axis, and supporting the thus partially finished shaft in a suitable chucking device by definitely located abutment means of the device presenting abutment areas to the respective finished areas of the shaft web.

32. The method of chucking a crank shaft for turning cylindrical portions of the shaft by engagement with angularly alined webs of the shaft spaced longitudinally thereof, which comprises finishing areas in a definite relation to each other and to a proper axis of each cylindrical portion, one area on a side of each of said webs, which areas face along the diametral lengths of the webs, finishing areas in a definite relation to each other and to said proper axis, one area on a side of each of said webs, which areas face outwardly transversely of the web, and supporting the thus partially finished shaft in suitable synchronously rotatable chuck bodies by definitely located abutment means of the bodies presenting abutment areas to the respective finished areas of the shaft webs.

33. A chucking device as set forth in claim 29, in which the two abutment means at one side of the web, for engaging the web areas facing, respectively, along the length of the web and transversely outwardly of the web, are located in close adjacency in the device, for engaging the respective web areas when these areas are formed in close adjacency on the web of the shaft.

34. The method as set forth in claim 31, in which two areas are finished on the web, facing, respectively, along the length of the web and outwardly transversely of the web, both on the same side of the web in close adjacency to each other.

35. As a novel article in an incomplete stage of a novel method of manufacture of the completed article, a work piece for forming a crank shaft, comprising a cylindrical portion and a web adjacent to the cylindrical portion, said work piece being prepared for chucking to turn the cylindrical portion, in that it is provided with a finished area on each side of the web, facing along the diametral length of the web in a definite relation to the proper axis of said cylindrical portion, and with a finished area on at least one side of the web, facing outwardly in a definite relation to said proper axis transversely of the web.

36. An article as set forth in claim 35, in which two of the areas, facing, respectively, along the length of the web and outwardly transversely of the web, are both on the same side of the web in close adjacency to each other.

37. As a novel article in an incomplete stage of a novel method of manufacture of the completed article, a work piece for forming a crank shaft, comprising cylindrical portions and webs adjacent the respective cylindrical portions, said work piece being prepared for chucking to turn the cylindrical portions, in that it is provided with a finished area on each side of each two webs substantially spaced along the shaft, which areas face along the diametral lengths of the webs in a definite relation to a proper axis of each cylindrical portion along said lengths, and with a finished area on at least one side of each of said webs, facing outwardly in a definite relation to said proper axis transversely of the webs, the correspondingly facing areas on the two webs also being in a definite relation to each other as well as to said proper axes of the cylindrical portions, for chucking with a minimum of torsional distortion of the work piece.

38. In a machine of the class described, tool feed control mechanism comprising in combination, a tool feed carriage mounted for reciprocable movement, a hydraulic single-cylinder engine for advancing said carriage at one stroke and retracting said carriage on its return stroke, a source of supply of oil under pressure connected to said engine through a valve, whereby it may be supplied to either end of the cylinder of the engine or shut off entirely, a reciprocable cam member connected to said carriage for movement therewith and having a cam slot having connected valve closed, open and partially open advance, closed and open, retract portions, a reciprocable valve control member having a cam follower coacting with said cam slot, and movable normal thereto, resilient means urging said control member to valve open retract position, a latch for holding said control member in valve closed position only against the force of said resilient means, and means actuated by the pressure built up on the advance stroke of said engine for tripping said latch.

39. In a machine of the class described, tool feed carriage control mechanism comprising in combination, a tool feed carriage mounted for reciprocable movement, a hydraulic single-cylinder engine for advancing said carriage at one stroke, and retracting said carriage on its return stroke, a source of supply of oil under pressure connected to said engine through a valve, whereby it may be supplied to either end of the cylinder of the engine or shut off entirely, a reciprocable cam member connected to said carriage for movement therewith and having a cam slot, a reciprocable valve control member having a cam follower coacting with said slot, and movable normal thereto, resilient means urging said control member to valve open retract position, a latch for holding said control member in valve closed position only against the force of said resilient means, and means for tripping said latch.

40. In a machine of the class described, tool feed carriage control mechanism comprising in combination, a tool feed carriage mounted for reciprocable movement, an engine for advancing said carriage at one stroke and retracting said carriage on the return stroke, a reciprocable cam member connected to said carriage for movement therewith and having a cam slot, a reciprocable engine control member having a cam follower coacting with said cam slot, resilient means urging said control member to engine retract position, latch means for holding said control member in engine stopped position only against the force of said resilient means, and means actuated by the pressure built up on the advance of said engine for tripping said latch means.

41. In a machine of the class described, carriage control mechanism comprising in combination, a carriage mounted for reciprocable movement, an engine for advancing said carriage at one stroke and retracting said carriage on the return stroke, a cam member connected to said carriage for movement therewith and having a cam slot, an engine control member having a cam follower coacting with said cam slot, resilient means urging said control member to engine retract position, latch means for holding said control member in engine stopped position only against the force of said resilient means, and means actuated by said engine for tripping said latch means.

42. In a machine of the class described, the combination of a pair of tool feed carriages, of means for advancing and retracting said tool feed carriages, comprising rack and pinion means connecting said carriages, whereby when one is advanced or retracted the other is similarly moved, an oil cylinder having a reciprocating piston, rack and pinion means connecting said piston to the upper tool feed carriage, an oil pump connected to said cylinder through a suitable control valve, means driving said oil pump, a cam member connected to said upper tool feed carriage and having a cam slot of substantially rectangular form having a valve opening, open, partially open, closing, closed, advance and retract control portions, a cam follower pin coacting with said cam slot, a control member carrying said pin and connected to said control valve, a pivoted keeper adapted to engage a lug on said control member to latch it in open position, resilient means urging said control member to closed position, and a piston operated trip for actuating said keeper to release said control member to stop the advance of said carriages and start their retraction, and means connecting said cylinder to a casing for said piston operated trip, whereby the pressure built up within said cylinder at the end of the stroke of said piston is transmitted to and operates said piston operated trip.

43. In a machine of the class described, the combination with tool feed carriages, of means for advancing and retracting said tool feed carriages, comprising means connecting said carriages, whereby when one is advanced or retracted the other is similarly moved, an oil cylinder having a reciprocating piston, means connecting said piston to the upper tool feed carriage, an oil pump connected to said cylinder through a suitable control valve, means driving said oil pump, a cam member connected to said upper tool feed carriage and having a cam slot, a cam follower pin coacting with said cam slot, a control member carrying said pin and connected to said control valve, a pivoted keeper adapted to engage a lug on said control member to latch it in open position, resilient means urging said control member to closed position, and a piston operated trip for actuating said keeper to release said control member to stop the advance of said carriages and start their retraction, and means connecting said cylinder to a casing for said piston operated trip, whereby the pressure built up within said cylinder at the end of the stroke of said piston is transmitted to and operates said piston operated trip.

44. In a machine of the class described, the combination with a plurality of tool feed carriages, of means actuating said tool feed carriages, comprising rack and pinion means connecting said carriages, whereby when one is actuated the other is similarly moved, a fluid cylinder having a reciprocating piston, rack and pinion means connecting said piston to one of said tool feed carriages, a fluid pump connected to said cylinder through a suitable control valve, means driving said pump, a cam member connected to one of said tool feed carriages and having a cam slot form having valve opening, open, partially open, closing, closed advance and retract control portions, a cam follower coacting with said cam slot, a control member carrying said follower and connected to said control valve, a pivoted keeper adapted to engage a lug on said control member to latch it in open position, resilient means urging said control member to closed position, and a piston operated trip for actuating said keeper to release said control member to stop the advance of said carriages and start their retraction, and means connecting said cylinder to a casing for said piston operated trip whereby the pressure built up within said cylinder at the end of the stroke of said piston is transmitted to and operates said trip.

45. In a machine of the class described, the combination with a plurality of tool feed carriages, of means for actuating said tool feed carriages, comprising means connecting said carriages, whereby when one is actuated the other is similarly moved, a fluid cylinder having a reciprocating piston, means connecting said piston to one of said tool feed carriages, a fluid pump connected to said cylinder through a suitable control valve, means driving said pump, a cam member connected to one of said tool feed carriages and having a cam slot form having valve opening, open, partially open, closing, closed, advance and retract control portions, a cam follower coacting with said cam slot, a control member carrying said follower and connected to said control valve, a pivoted keeper adapted to engage a lug on said control member to latch it in open position, resilient means urging said control member to closed position, and a trip for actuating said keeper to release said control member, and means connecting said cylinder to a casing for said trip whereby the pressure built up within said cylinder at the end of the stroke of said piston is transmitted to and operates said trip.

46. In a machine of the class described, the combination of a pair of tool feed carriages, of means for actuating and retracting said tool feed carriages, comprising means connecting said carriages, whereby when one is actuated or retracted the other is similarly moved, means driving one of said carriages, control means therefor comprising a cam member connected to said one carriage and having an endless cam slot, a cam follower disposed in said slot, a reciprocable control member connected to said cam follower, resilient means urging said control member to closed position, means connecting said control member to said driving means, a pivoted keeper adapted to engage a lug on said control member when the latter is moved to open position, and means for tripping said keeper to release said control member when said carriages reach the ends of their travel, whereby to cause said driving means to retract said carriage.

47. In a machine of the class described, the combination with a plurality of tool feed carriages, means for actuating and retracting said tool feed carriages, comprising means for connecting said carriages, whereby when one is actuated or retracted the other is similarly moved, means driving said carriages, and control means therefor, comprising a cam member connected to said one carriage and having an endless cam slot, a cam follower disposed in said cam slot, a reciprocable control member connected to said cam follower, resilient means urging said control member to closed position, means connecting said control member to said driving means, means adapted to engage said control member when the latter is moved to open position, and means for actuating said engaging means to release said control member when said carriages reach the forward ends of their travel.

48. In a machine of the class described, a control mechanism comprising in combination a reciprocable cam member having a cam slot, a cam follower reciprocable normal to the movement of said cam member, a pivoted manual control lever removably connected to said cam follower, means connecting said manual control lever to a two-way control valve, resilient means urging said cam follower in one direction, means for latching said cam follower against the force of said resilient means, means for releasing said latch in response to the position of said cam member, a controlled member, means for driving said member, means connecting said controlled member to said cam member, and means associating said control valve to said driving means.

49. In a machine of the class described, a control mechanism comprising in combination a cam member having a cam slot, a cam follower, a pivoted manual control lever removably connected to said cam follower, means connecting said manual control lever to a control valve, resilient means urging said cam follower in one direction, means for latching said cam follower against the force of said resilient means, means for releasing said latch in response to the position of said cam member, a controlled member, means for actuating said member, means connecting said controlled member to said cam member, and means associating said control valve to said driving means.

WILLIAM F. GROENE.
GEORGE W. LUNING.

DISCLAIMER

Re. No. 19,905.—*William F. Groene* and *George W. Luning*, Cincinnati, Ohio. CRANKSHAFT LATHE. Patent dated March 31, 1936. Disclaimer filed July 27, 1938, by the assignee, *The R. K. LeBlond Machine Tool Co.*

Hereby enters this disclaimer to claim 19 in said specification.

[*Official Gazette August 30, 1938.*]